United States Patent
Kerr et al.

(10) Patent No.: US 8,450,979 B2
(45) Date of Patent: May 28, 2013

(54) POWER ADAPTER WITH INTERNAL BATTERY

(75) Inventors: Duncan Kerr, San Francisco, CA (US); David Robbins Falkenburg, San Jose, CA (US); Michael Nugent, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 782 days.

(21) Appl. No.: 12/570,065

(22) Filed: Sep. 30, 2009

(65) Prior Publication Data

US 2011/0074360 A1    Mar. 31, 2011

(51) Int. Cl.
*H02J 7/00* (2006.01)
*H02J 9/00* (2006.01)

(52) U.S. Cl.
USPC ........... 320/137; 320/138; 320/103; 320/107; 307/46; 307/64; 307/66

(58) Field of Classification Search
USPC ........................................ 320/137
See application file for complete search history.

(56) References Cited

U.S. PATENT DOCUMENTS

| | | | |
|---|---|---|---|
| 3,626,408 A | 12/1971 | Carbrey | |
| 4,101,787 A | 7/1978 | Vail | |
| 4,149,162 A | 4/1979 | Enemark et al. | |
| 4,413,221 A | 11/1983 | Benjamin et al. | |
| 4,423,379 A | 12/1983 | Jacobs et al. | |
| 5,036,284 A | 7/1991 | Cichanski | |
| 5,061,898 A | 10/1991 | Oram et al. | |
| 5,185,565 A | 2/1993 | Uchida | |
| 5,268,845 A | 12/1993 | Startup et al. | |
| 5,438,270 A | 8/1995 | Harper et al. | |
| 5,477,132 A | 12/1995 | Canter et al. | |
| 5,504,415 A | 4/1996 | Podrazhansky et al. | |
| 5,623,210 A | 4/1997 | Sakamoto | |
| 5,640,079 A | 6/1997 | Nelson et al. | |
| 5,684,686 A | 11/1997 | Reddy | |
| 5,710,504 A | 1/1998 | Pascual et al. | |
| 5,721,481 A * | 2/1998 | Narita et al. | 320/111 |
| 5,831,351 A | 11/1998 | Kohosrowpour et al. | |
| 5,852,557 A | 12/1998 | Woodward | |
| 5,912,552 A | 6/1999 | Tateishi | |
| 5,939,864 A | 8/1999 | Lenhart et al. | |
| 6,008,629 A | 12/1999 | Saeki et al. | |
| 6,057,666 A | 5/2000 | Dougherty et al. | |
| 6,061,638 A | 5/2000 | Joyce | |
| 6,064,187 A | 5/2000 | Redl et al. | |
| 6,067,241 A | 5/2000 | Lu | |
| 6,075,345 A * | 6/2000 | Lee | 320/138 |

(Continued)

FOREIGN PATENT DOCUMENTS

| | | |
|---|---|---|
| DE | 19504468 | 8/1995 |
| EP | 1961621 | 8/2008 |

(Continued)

*Primary Examiner* — Yalkew Fantu
(74) *Attorney, Agent, or Firm* — Park, Vaughan, Fleming & Dowler, LLP

(57) ABSTRACT

An adapter including an associated battery capable of powering an electronic device. The power adapter typically includes the battery as an integral component that is connected to a plug or other interface capable of mating with a power source, such as a wall socket. Thus, the adapter battery may provide power either to operate the device or charge a battery within (or otherwise associated with) the device even if the adapter is not connected to a power source.

6 Claims, 5 Drawing Sheets

U.S. PATENT DOCUMENTS

| | | | |
|---|---|---|---|
| 6,144,194 A | 11/2000 | Varga | |
| 6,157,168 A * | 12/2000 | Malik | 320/128 |
| 6,229,293 B1 | 5/2001 | Farrenkopf | |
| 6,268,711 B1 | 7/2001 | Bearfield | |
| 6,307,378 B1 | 10/2001 | Kozlowski | |
| 6,313,636 B1 | 11/2001 | Pohl et al. | |
| 6,323,627 B1 | 11/2001 | Schmiederer et al. | |
| 6,326,774 B1 | 12/2001 | Mueller et al. | |
| 6,331,365 B1 | 12/2001 | King | |
| 6,337,560 B1 | 1/2002 | Kalogeropoulos et al. | |
| 6,366,070 B1 | 4/2002 | Cooke et al. | |
| 6,400,123 B1 | 6/2002 | Bean et al. | |
| 6,465,913 B1 * | 10/2002 | Nagai et al. | 307/85 |
| 6,507,168 B1 | 1/2003 | Matsuda et al. | |
| 6,534,993 B2 | 3/2003 | Bertness | |
| 6,548,755 B2 | 4/2003 | Wu | |
| 6,583,606 B2 | 6/2003 | Koike et al. | |
| 6,661,116 B1 | 12/2003 | Seto | |
| 6,677,734 B2 | 1/2004 | Rothleitner et al. | |
| 6,683,441 B2 | 1/2004 | Schiff et al. | |
| 6,762,563 B2 | 7/2004 | St. Germain et al. | |
| 6,771,046 B2 | 8/2004 | Ariga et al. | |
| 6,809,504 B2 | 10/2004 | Tang et al. | |
| 6,836,157 B2 | 12/2004 | Rader et al. | |
| 6,914,412 B2 | 7/2005 | Wang et al. | |
| 6,947,178 B2 | 9/2005 | Kuo et al. | |
| 6,980,912 B2 | 12/2005 | Patino et al. | |
| 7,012,402 B2 | 3/2006 | Miller et al. | |
| 7,078,908 B2 | 7/2006 | Fujita et al. | |
| 7,157,888 B2 | 1/2007 | Chen et al. | |
| 7,191,077 B2 | 3/2007 | Mese et al. | |
| 7,216,044 B2 | 5/2007 | Kato et al. | |
| 7,242,169 B2 | 7/2007 | Kanamori et al. | |
| 7,259,538 B2 | 8/2007 | Melton et al. | |
| 7,266,001 B1 | 9/2007 | Notohamiprodjo et al. | |
| 7,274,112 B2 | 9/2007 | Hjort et al. | |
| 7,282,891 B2 | 10/2007 | Smallwood et al. | |
| 7,388,349 B2 | 6/2008 | Elder et al. | |
| 7,570,015 B2 | 8/2009 | Bansal et al. | |
| 7,598,711 B2 | 10/2009 | Krah et al. | |
| 7,646,620 B2 | 1/2010 | MacDonald et al. | |
| 7,688,029 B2 | 3/2010 | Hoffman | |
| 7,702,178 B2 | 4/2010 | Bergen et al. | |
| 2003/0015993 A1 | 1/2003 | Misra et al. | |
| 2003/0090239 A1 * | 5/2003 | Sakakibara | 320/166 |
| 2005/0077875 A1 | 4/2005 | Bohley | |
| 2005/0258941 A1 | 11/2005 | Berard | |
| 2005/0266300 A1 | 12/2005 | Lamoreux et al. | |
| 2006/0174141 A1 | 8/2006 | Chang | |
| 2007/0091187 A1 | 4/2007 | Lin | |
| 2008/0090133 A1 | 4/2008 | Lim et al. | |
| 2008/0315842 A1 * | 12/2008 | Li et al. | 320/137 |
| 2009/0021077 A1 * | 1/2009 | Zilberberg | 307/66 |
| 2009/0059255 A1 | 3/2009 | Ohide | |
| 2009/0208824 A1 | 8/2009 | Greening et al. | |
| 2009/0261653 A1 | 10/2009 | Furukawa et al. | |
| 2009/0289603 A1 | 11/2009 | Mahowald | |
| 2009/0309552 A1 | 12/2009 | Krah et al. | |
| 2009/0315411 A1 | 12/2009 | Depew | |
| 2010/0027906 A1 | 2/2010 | Hara et al. | |
| 2011/0074434 A1 | 3/2011 | Staton | |

FOREIGN PATENT DOCUMENTS

| | | |
|---|---|---|
| FR | 2090074 | 1/1972 |
| GB | 2046923 | 11/1980 |
| GB | 2275118 | 8/1994 |
| WO | WO2008/075358 | 6/2008 |

* cited by examiner

POWER ADAPTER WITH INTERNAL BATTERY

TECHNICAL FIELD

This invention relates generally to power supplies for supplying power to portable electronic devices having a rechargeable battery, and more specifically to a power adapter including a rechargeable adapter battery.

BACKGROUND

Rechargeable batteries may be found in a variety of portable electronic devices, including laptop computers, personal digital assistants (PDAs), cell phones, digital media players, cameras, etc. The rechargeable battery in such devices is typically charged using power supplied from a power adapter connected to an external power source. The power adapter may also be configured to provide power to run the device, in conjunction with charging the internal battery.

Existing adapters do not include an battery source for powering electronic devices and/or powering an internal battery. As such, users desiring additional battery power will typically purchase an external battery that can be separately connected to the portable electronic device. However, such external batteries are generally cumbersome to use, at least because they must be unpacked for use and then repacked for storage. In addition, many users may forget to bring the external battery in addition to the adapter while in transit.

What is needed is a way to combine a power adapter and a battery so that a user does not have to carry an additional external battery while traveling with a portable electronic device.

SUMMARY

Generally, embodiments discussed herein provide power to an electronic device from a battery external to the device but associated with a power adapter. The power adapter typically includes the battery as an integral component that is connected to a plug or other interface capable of mating with a power source, such as a wall socket. Thus, presuming the adapter is plugged into the electronic device, the adapter battery may provide power either to operate the device or charge a battery within (or otherwise associated with) the device even if the adapter is not connected to a power source.

Further, the adapter may include a processor, such as a microcontroller, that may execute logical operations to intelligently determine how to distribute charge between the adapter battery and device battery, based at least in part on an operating state of the device. The adapter processor may communicate with a processor inside the device and, in some embodiments, the device processor may assist in such logical operations or may perform the operations and instruct the adapter processor accordingly. Thus, the adapter may vary its charging function depending on operating variables not only of the adapter itself, but also those of the device to which it is connected.

One embodiment takes the form of an apparatus for providing power to an electronic device, including: a processor; a battery operatively connected to the processor; a power output operatively connected to the battery and configurable to be connected to the electronic device; a relay operatively connected to the battery and the processor; and a power input operatively connected to the battery and the relay.

Another embodiment takes the form of a method for powering an electronic device from an adapter having an internal adapter battery The method may include the following operations: determining if the adapter is connected to a power source; in the event the adapter is connected to the power source, determine if the device is connected to the adapter; in the event the device is connected to the adapter, operating the device from the power source; and in the event the device is not connected to the adapter, charging the internal adapter battery.

These and other embodiments and features will be apparent to those of ordinary skill in the art upon reading this disclosure in its entirety, along with the appended claims.

DETAILED DESCRIPTION

A portable electronic device, such as a laptop computer, may include an internal battery to provide power for several hours of operation while the laptop computer is not connected to an external power source. Generally, in order to continue operation once the internal battery is depleted, one must recharge the battery, replace it, or connect the portable electronic device to a power source such as an electrical outlet. Further, many portable electronic devices are sealed and so a user cannot replace the internal battery, or at least cannot do so easily.

An adapter having its own internal battery may be connected to a portable electronic device to provide power to operate the device once its battery is depleted. In some embodiments, the adapter and the electronic device may each include respective microcontroller units that are configured for sharing information, such as battery charge and power source information, between the various internal hardware components, as well as between the electronic device and the adapter.

It should be noted that an adapter with an internal battery, as described herein, may be used with any appropriately-configured portable electronic device or non-portable device, for that matter. Suitable electronic devices include, but are not limited to, mobile telephones, portable computers, tablet computing devices, input/output devices, portable video players, portable televisions, personal digital assistants, headphones, and so on.

Figure 1:
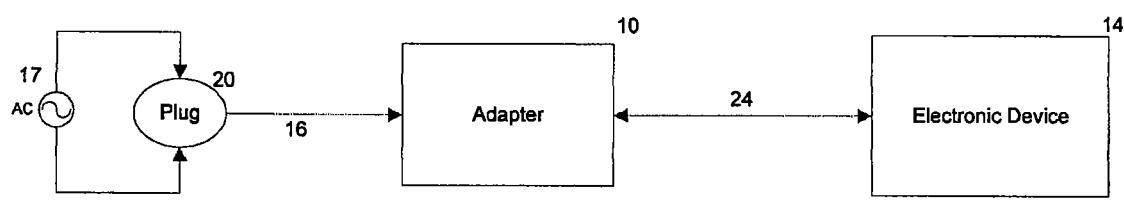
FIG. 1 illustrates an embodiment of a power adapter having a rechargeable battery coupled to an electronic device.
Figure 2:
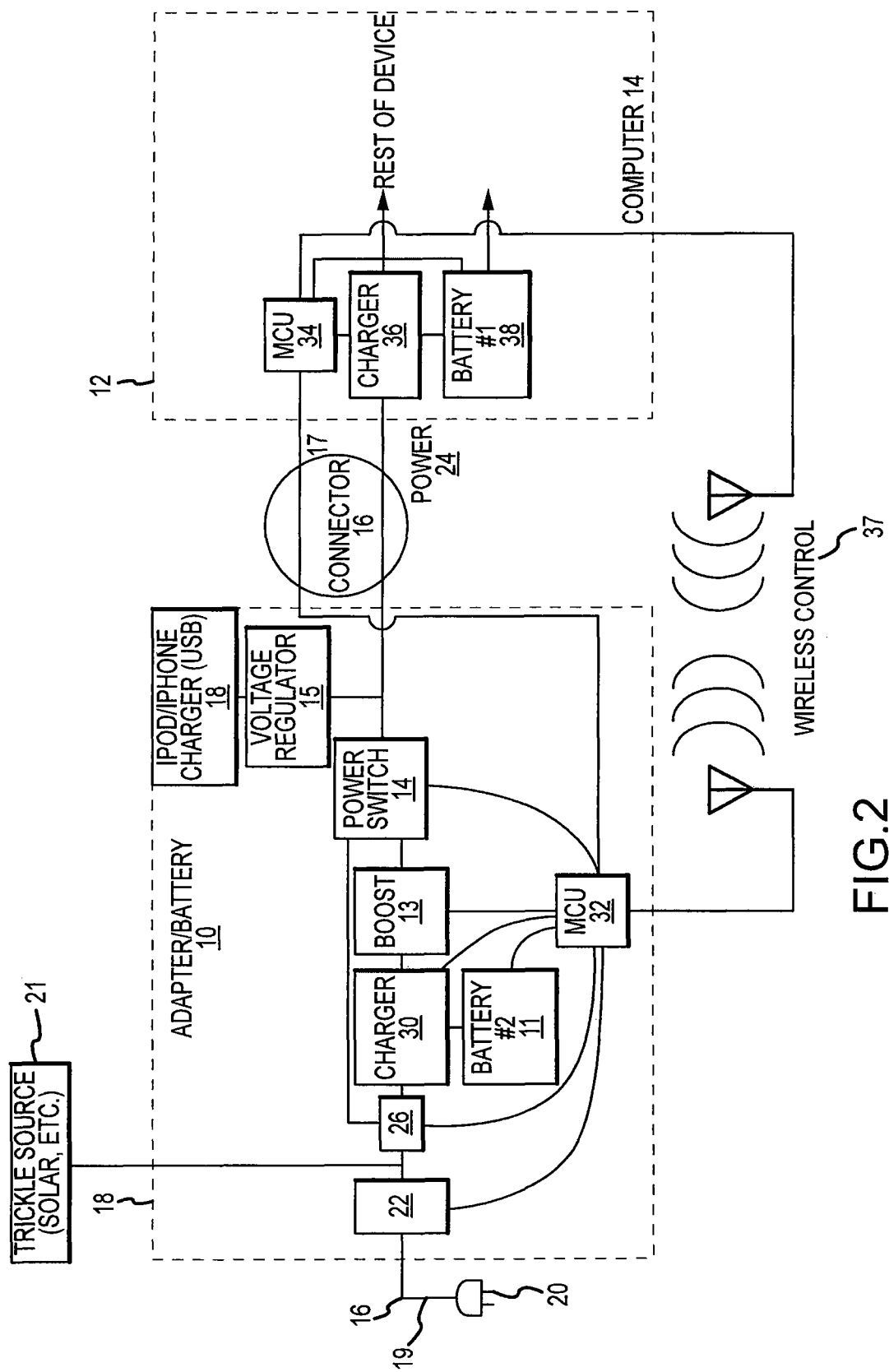
FIG. 2 is a block diagram of the embodiment of the power adapter and electronic device shown in FIG. 1.

As shown in FIGS. 1 and 2, in one embodiment, an electronic device 12 having a rechargeable internal battery 38 may be connected to a power adapter 10 having a rechargeable adapter battery 11. The power adapter 10 may also be connected to a power source 17 via a plug 20. The sample electronic device 12 shown in FIG. 1 and discussed herein is a portable computer, but it should be understood that any of the aforementioned devices may be appropriately configured and substituted. In addition, the power source 17 may be any source of electrical power, including a direct current (DC) power source, although an alternating current (AC) source is illustrated in FIG. 1.

The adapter 10 may include an output connector 24 connecting the adapter 10 to the electronic device 14, as well as an input power line 16 connecting the adapter 10 to the external power source 17. In some embodiments, the adapter may further include an outer housing 18 for protecting the internal components of the adapter 10, and the input power line 16 may include a cord coupled to a plug 20 configured for plugging into the external power source 17. In other embodiments, the plug 20 may extend directly from the housing 18, rather than from a cord.

The output connector 24 may include a plug that may be received by a receiving port on the electronic device 14 (port not shown). In some embodiments, the plug may include a quick release mechanism that enables the plug to disengage from the receiving port if it is tugged on, for instance by someone tripping over the output cord. In addition, the output connector 24 may further include a light indicator, such as a light-emitting diode (LED), configured to indicate the battery charge state, e.g., charging or fully charged, of the adapter battery 11 and/or the internal rechargeable battery 38 in the electronic device 12. One connector that may be used in conjunction with an embodiment of the power adapter 10 is the MAGSAFE connector manufactured by Apple Inc.

FIG. 2 is a block diagram schematically illustrating some of the internal components of the power adapter 10 and electronic device 12 shown in FIG. 1. As shown in FIG. 2, the electronic device 12 may include an internal device microcontroller unit 34 and an internal charger 36, as well as an internal rechargeable internal battery 38. The device microcontroller unit 34 may be connected to the internal charger 36 and the internal battery 38, as well as to the adapter microcontroller unit 32 of the adapter 10. In some embodiments, the device microcontroller unit 34 may also be connected to a wireless control device 37 configured to receive and transmit information to the adapter microcontroller unit 32 of the adapter 10. The internal charger 36 may be connected to the internal rechargeable battery 38, as well as to the adapter 10 through a power line 24 configured to supply voltage from the adapter 12 to the charger 36.

Additionally, the internal charger 36 may be connected, either wirelessly or through physical communication channels, to the other components of the electronic device 12 in order to direct power to these components when the adapter 10 is connected to an external power source 17 (as shown in FIG. 1). The internal battery 38 may also be connected to the other components of the electronic device 12 to supply battery power to these components when, for example, the electronic device 12 is not connected to the adapter 10 and/or the adapter 10 is not connected to an external power source.

In one embodiment, the device microcontroller unit 34 may include one or more inputs that receive data from the internal battery 38 and the adapter microcontroller unit 32 of the adapter 10. For example, in one embodiment, the device microcontroller unit 34 may be configured to receive information from the internal battery 38 indicating the charge level of the battery 38. Continuing the example, the charge level may be reported in various states indicating if the battery 38 is very low, low, adequate or fully charged. As will be described more fully below, the device microcontroller unit 34 may also be configured to receive information from the adapter microcontroller unit 32 indicating the level of charge of the adapter battery 11 and/or whether the adapter 10 is connected to an external power source. As shown in FIG. 2, this information may be sent via a physical communication channel 17 or through a wireless control device 37. Additionally, the device microcontroller unit 34 may include one or more sensors for measuring and monitoring the power being supplied from the adapter 10 to the electronic device 12 via power line 24.

The device microcontroller unit 34 may likewise include one or more outputs for transmitting information to the adapter microcontroller unit 32. For example, the device microcontroller unit 34 may be configured to transmit the charge level received from the internal battery 38 to the adapter microcontroller unit 32 of the adapter 10, either through a physical communication channel 17 or a wireless control device 38.

The device microcontroller unit 34 also may include a control line outputting a control signal to the internal charger 36; the microcontroller 34 typically generates this control signal. The control signal may enable the charger 36 to either begin or stop charging the internal battery 38. The control signal may be based on the charge level information received from the adapter microcontroller unit 32 regarding the adapter battery 11, whether the adapter 10 is connected to an external power source and/or the charge level information received from the internal battery 38.

As shown in FIG. 2, the power adapter 10 may include a converter 22, a relay 26, a charger 30, a rechargeable internal battery 11, a adapter microcontroller unit 32, a boost converter 13, a power switch 14, a voltage regulator 15, and/or one or more universal serial buses 18 (USB).

In one embodiment, the converter 22 is connected to the external power source 17 (as shown in FIG. 1) via an input power line 16, which may include a cord and an associated plug 20. The converter 22 may convert AC voltage received from the power source 17 into DC voltage that is usable by the other components in the adapter 10, as well as by the electronic device 12. Additionally, the converter 22 may be connected to a relay 26 that is configured to supply voltage either from the converter 22 to the charger 30 to charge the adapter battery 11 or directly from the converter 22 to the power switch 14, bypassing the charger 30 and the battery 11. As will be discussed in more detail below, the determination as to whether voltage is supplied directly to the power switch 14 or through the charger 30, battery 11 and the boost converter 13 is made by the adapter microcontroller unit 32.

In some embodiments, the power adapter 10 may include an additional input configured to receive power from a trickle power source 21, such as a solar or photovoltaic cell, supplying a trickle voltage. As shown in FIG. 1, the trickle power source 21 may be connected to the charger 30 so as to supply voltage to the charger 30 and/or the power switch 14, while bypassing the converter 22.

As shown in FIG. 2, relay 26 may be set so that voltage is supplied from the converter 22 to the charger 30. In one embodiment, the charger 30 may be configured to supply a current to the adapter battery 11 to charge the battery 11. The charger 30 may also be configured to supply voltage from the battery 11 to a boost converter 13, which in turn may be configured to convert the voltage received from the battery 11 to output a higher DC voltage. The boost converter 13 may, in turn, be connected to the power switch 14.

The power switch 14 may be configured to receive voltage directly from the converter 22 (via relay 26) or from the boost converter 13. Further, the power switch 14 may be connected to the internal charger 36 of the electronic device 12 by the power connector 24, initially discussed with respect to FIG. 1. The power switch 14 may further be configured to supply voltage to an additional port provided in the adapter 10, such as a USB port 18 configured to receive a secondary portable electronic device, such as a cellular phone and/or a portable media player. Examples of suitable such devices include an iPod or an iPhone, as currently manufactured by Apple Inc. A voltage regulator 15 may regulate the voltage outputted by the power switch 14 in order to maintain a constant voltage level, thereby preventing or minimizing damage to the secondary device caused by sudden voltage increases in the external power source (as well as ensuring the voltage level is sufficient to operate or charge the secondary device).

Still with respect to FIG. 2, a adapter microcontroller unit 32 may be electrically connected to various components of the power adapter, including the power switch 14, the boost converter 13, the charger 30, the adapter battery 11, the relay 26 and/or the converter 22. The adapter microcontroller unit 32 may also be connected via a control line 17 to the internal device microcontroller unit 34 of the electronic device 12. In some embodiments, the adapter microcontroller unit 32 may also be wirelessly connected via a wireless control device 37 to the internal device microcontroller unit 34 of the electronic device 12.

The adapter microcontroller unit 32 may include a microprocessor, a program memory in the form of a NOR flash or ROM, as well as an EEPROM (or other erasable storage mechanism). Additionally, the microcontroller unit may further include other functional components, such as a crystal oscillator, timers, watchdog, serial and analog I/O, etc. As would be appreciated by one of skill in the art, the microcontroller 32 may be fabricated on a single integrated chip, or may include components located on multiple chips.

The adapter microcontroller unit 32 may include a plurality of inputs and/or outputs for receiving information regarding various components within the adapter 10 and/or controlling these components. For example, in one embodiment, the adapter microcontroller unit 32 may be configured to receive information from the converter 22 indicating whether the converter 22 is receiving voltage from the input power line 16, i.e., whether the adapter 10 is receiving power from an external power source. Additionally, the adapter microcontroller unit 32 may be configured to receive information from the adapter battery 11 indicating the charge level of the battery 11, for example, whether the battery is very low, low, adequate and/or fully charged. The adapter microcontroller unit 32 may further include an additional input for receiving information from the internal device microcontroller unit 34 of the electronic device 12, such as the charge level of the internal battery 36 of the electronic device 12.

The adapter microcontroller unit 32 may also control and/or monitor various functions of the adapter 10. For example, the device microcontroller unit 34 may be configured to transmit the charge information received from the adapter battery 11 to the internal device microcontroller unit 34, either through a physical communication channel 17, or through a wireless control device 38. In addition, the adapter microcontroller unit 32 may transmit control signals to the charger 30, boost converter 13, relay 26 and/or power switch 14 based on information received from the converter 22, the adapter battery 11, and/or the internal device microcontroller unit 34 of the electronic device 12.

Continuing the discussion, the adapter microcontroller unit 32 may be connected to the adapter charger 30 by a control line. The adapter microcontroller may generate and transmit a control signal instructing the charger 30 to either begin or stop charging the adapter battery 11, as necessary or desired. In addition, the adapter microcontroller unit 32 may also control operation of the boost converter 13, the relay 26 and power switch 14. Thus, opening and closing of relay 26 and power switch 14 is generally under the control of the adapter microcontroller, which may thus direct power to flow directly from the converter 22 to the device 12 or through the charger 30, battery 11, and boost controller 13.

Figure 3A:
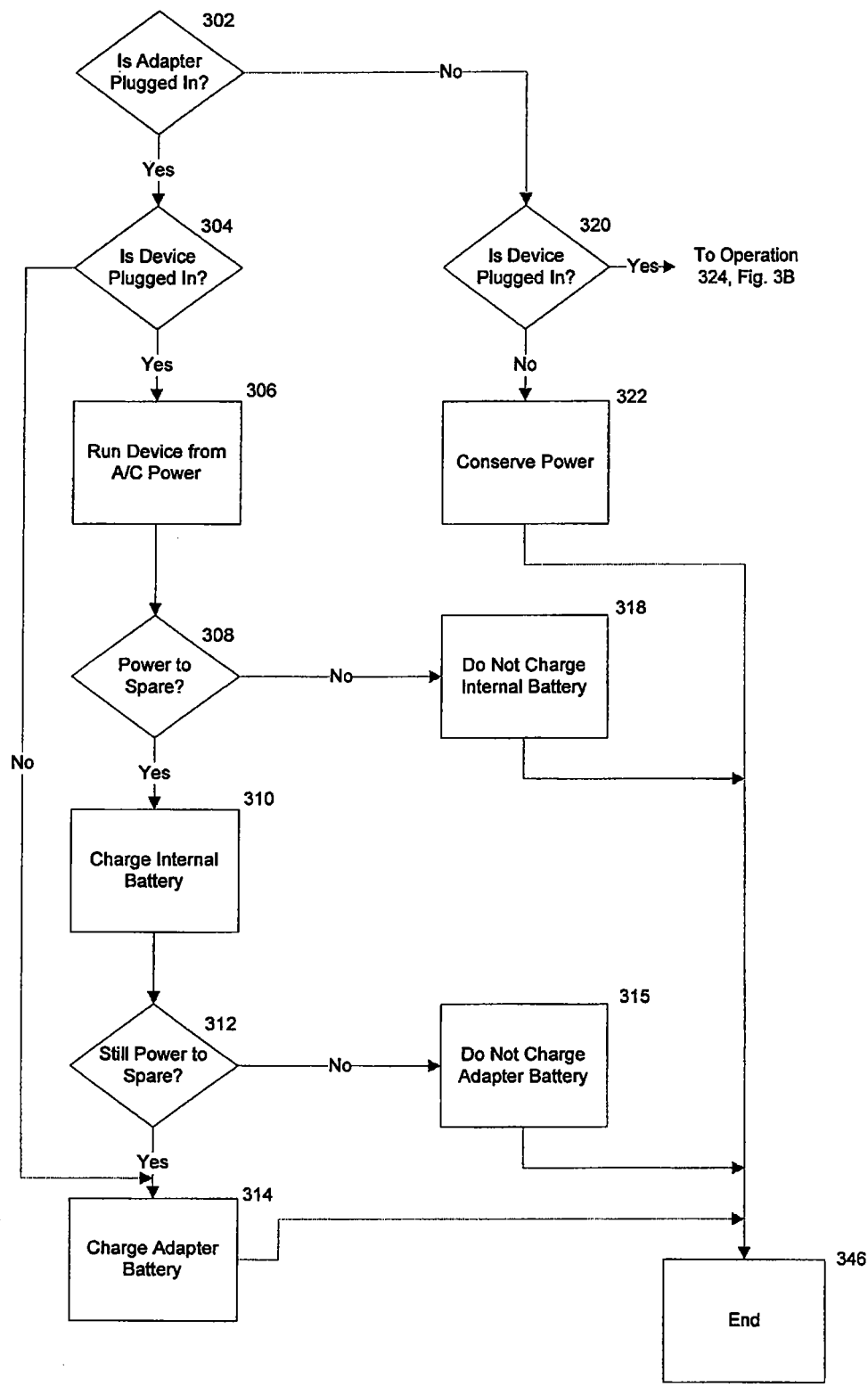
FIGS. 3A-3B are a flow diagram illustrating the power adapter and electronic device of FIG. 1 in various stages of use.

FIG. 3A is a flowchart illustrating one method for supplying power between an electronic device and an adapter having a battery if the adapter is connected to a power source, but the electronic device is not connected to the adapter. Initially, in operation 302 the embodiment may determine whether the adapter has been connected to an external power source. Referring to FIG. 2, this operation is typically performed by the adapter microcontroller unit 32 of the adapter 10, which receives information from the converter 22 indicating whether the adapter 10 is connected to the external power source 17.

If, in operation 302, the embodiment determines that the adapter is connected to an external power source, it may determine whether the electronic device is connected to the adapter in operation 304. This determination may be made by either the device microcontroller unit 34, which receives information from the internal charger 36 indicating whether the electronic device 12 is connected to the adapter 10 via the power line 24, or the adapter microcontroller unit 32. It should be noted that operation 304 may be optional in certain embodiments or may occur prior to operation 302, in which case operation 320 may be omitted.

If in operation 304 the embodiment determines that the electronic device is not connected, then operation 314 is executed and the embodiment will charge the adapter battery from the external power source. This operation is generally performed via the adapter microcontroller unit 32 which is configured to transmit a control signal to the relay 26 to supply voltage from the converter 22 to the adapter charger 11. The adapter microcontroller unit 32 is further configured to transmit a control signal to the adapter charger 30 enabling the charger 30 to charge the adapter battery 11. Following operation 314, the method ends in end state 346.

Continuing the discussion of FIG. 3A, as previously mentioned, in operation 304 the embodiment determines if the electronic device is connected to an external power source. If the embodiment determines that the electronic device is connected to an external power source, then operation 306 is accessed and the embodiment will run the electronic device from the external power source.

Referring back to FIG. 2, if the adapter microcontroller unit 32 receives an indication that the adapter 10 is connected to a power source and the device microcontroller unit 34 of the electronic device 12 receives an indication that the electronic device 12 is connected to the adapter 10, the adapter microcontroller unit 32 may transmit a control signal to the relay 26 to supply voltage from the converter 22 directly to the power switch 14, bypassing the charger 30 and the boost converter 13. The adapter microcontroller unit 32 may also transmit a control signal to the power switch 14 to supply voltage received from the relay 26 to the adapter 12.

Turning back to FIG. 3A, operation 308 is executed after operation 306. In operation 308, the embodiment will determine whether there is excess power available in light of the power requirements necessary to operate the device. This determination is made by the device microcontroller unit 34 of the electronic device 12, which may include sensors for monitoring the power supplied to the internal charger 36 from the adapter 12 via the power line 24. If there is insufficient power for any operation beyond supplying power to the device, then operation 318 is accessed and the embodiment will not charge the internal battery. Accordingly, the embodiment and will continue to only run the computer from the external power supply. Referring to FIG. 2, if the device microcontroller unit 34 of the electronic device 12 determines that there is insufficient power to charge the internal battery 36, the microcontroller 34 will transmit a control signal to the internal charger 36 to disable charging of the internal battery 36, and to provide power received from the adapter 10 to power the other components of the electronic device 12.

Following the execution of operation 315, the method ends in end state 346.

It may alternately be determined in operation 308 that the available power is sufficient to charge the internal battery. If so, the embodiment proceeds to operation 310 and the internal battery is charged.

Next, in operation 312, the embodiment determines if there is still sufficient available power to charge the adapter battery. This determination may be made by the device microcontroller unit 34 or the adapter microcontroller. If, in operation 312, there is sufficient available power to charge the adapter battery, then in operation 314 the embodiment will charge the adapter battery. As mentioned above, this operation is performed via the adapter microcontroller unit 32 which is configured to transmit a control signal to the relay 26 to supply voltage from the converter 22 to the adapter charger 11, as well as transmit a control signal to the adapter charger 30 to charge the adapter battery 11.

If, in operation 312, if there is not sufficient available power to charge the adapter battery, then in operation 315 the embodiment will not charge the adapter battery. Referring to FIG. 2, if the device microcontroller unit 34 of the electronic device 12 determines that there is insufficient power to charge the adapter battery 11, the microcontroller 34 will transmit this information to the adapter microcontroller unit 32, which in turn will transmit control signals to relay 26 and power switch 14 to supply voltage directly from the converter 22 to the charger 36 of the electronic device 12, bypassing the charger 30 and boost converter 13.

After either operation 314 or 315, the method terminates in end state 346.

The discussion of FIG. 3A now returns to operation 302. If the embodiment determines that the adapter is not connected to an external power source in this operation, then, in operation 320, the embodiment determines whether the electronic device is connected to an external power source. Referring to FIG. 2, this may be accomplished by the microcontroller 34 of the electronic device 12, which may receive information from the charger 36 indicating whether the charger 36 is connected to the adapter 10. It should be noted that operation 320 may be optional in certain embodiments or may occur prior to operation 302.

If, in operation 320, the embodiment determines that the adapter is not connected to an external power source, then operation 322 is executed and the embodiment will conserve power of both the adapter battery 11 and the internal battery 38. This may be accomplished in the embodiment shown in FIG. 2 by the microcontroller units 34, 32 of the electronic device 12 and the battery 12, which may transmit respective control signals to the chargers 36, 30 to disable charging of the batteries 11, 38. After operation 322, the method ends in operation 346.

Figure 3B:
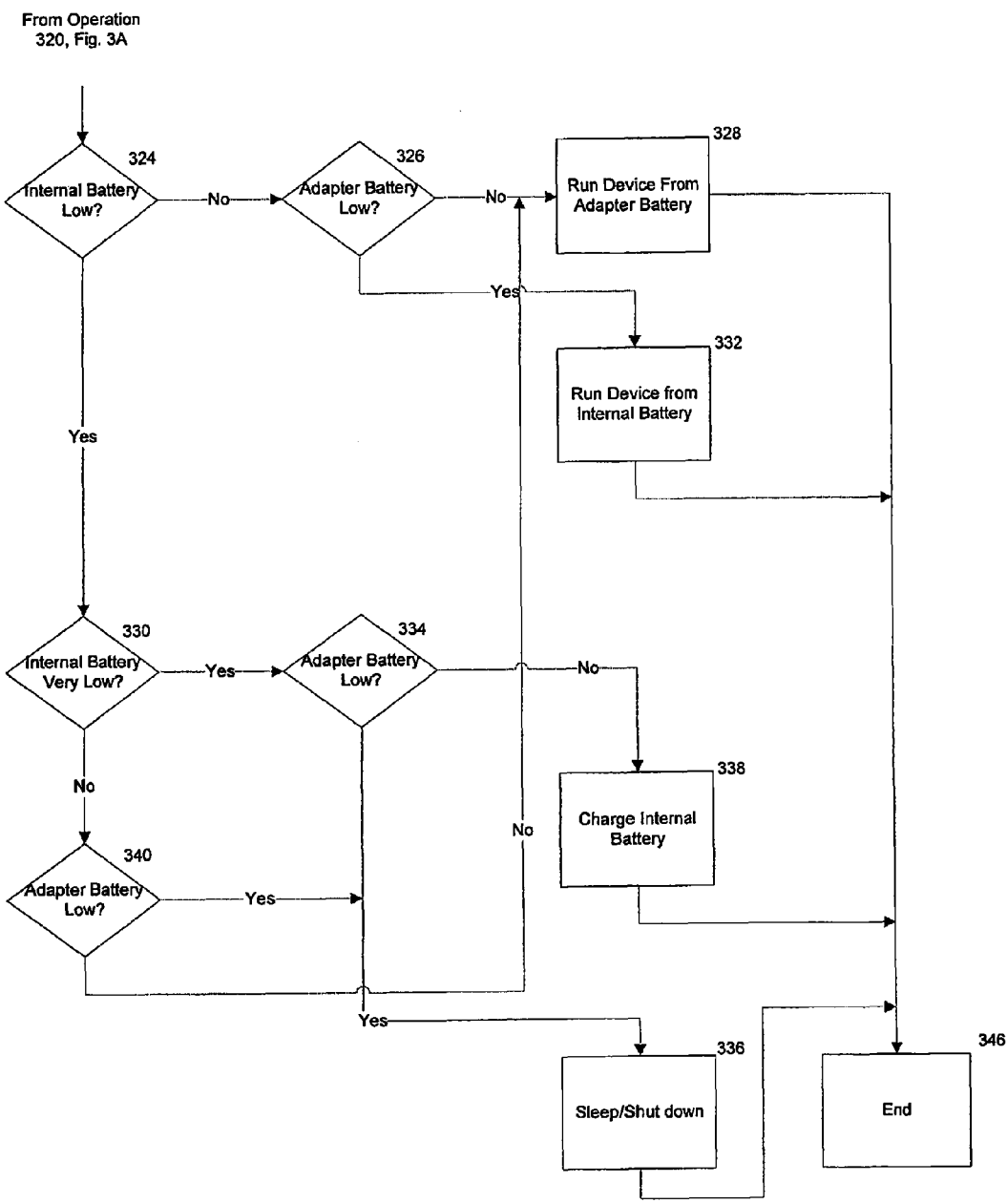

FIG. 3B is a flowchart illustrating another portion of the method initially discussed with respect to FIG. 3A. A positive determination in operation 320 of FIG. 3A, as discussed above, results in the embodiment entering operation 324 of FIG. 3B. In operation 324, the embodiment determines whether the internal battery is at a low charge level. For example, referring to FIG. 2, operation 324, the microcontroller 34 of the electronic device 12 may be configured to receive a signal from the internal battery 38 indicating a level of charge of the battery 38. The value of a "low charge level" may be set by the manufacturer or may, in certain embodiments, be user-specified. As one example, a 25% charge level may be considered low.

If, in operation 324, the embodiment determines that the internal battery is not at a low charge level, then operation 326 is performed. In operation 326, the embodiment determines whether the adapter battery is at a low charge level. As previously mentioned, this operation may be performed by the microcontroller 32 of the adapter 10, which is configured to receive a signal from the adapter battery 11 indicating a level of charge of the battery 11.

If, in operation 326, the embodiment determines that the adapter battery is at a low charge level, then in operation 332, the embodiment will run the electronic device from its internal battery. Referring to FIG. 2, this may be accomplished by the device microcontroller unit 34 of the electronic device 12, which may transmit a control signal to the charger 36 to disable charging, as well to the internal battery 38 to supply power to the other components of the electronic device 12. Following operation 332, the method terminates in end state 346.

If, however, in operation 326, the embodiment determines that the adapter battery is not at a low level, then in operation 328, the embodiment will run the electronic device from the adapter battery. Although this may not be the most efficient use of power, since power will be lost as it is transferred from the adapter battery to the computer battery, this operation provides a practical benefit, in that internal battery power of the electronic device is preserved. Referring to FIG. 2, this operation may be performed by transmitting a control signal from the device microcontroller unit 34 of the electronic device 12 to the internal charger 36 to supply voltage to the internal battery 38. The adapter microcontroller unit 32 of the adapter 10 may also transmit a control signal to the adapter charger 30 enabling the charger 30 to supply voltage from the battery 11 to the boost converter 13. In addition, the adapter microcontroller unit 32 may further transmit additional control signals to the boost converter 13 and the power switch 14 to perform their respective functions. Following operation 328, the method terminates in operation 346.

Returning to operation 324, the embodiment may determine that the internal battery is at a low charge level. If so, operation 330 is accessed and the embodiment determines if the internal battery is at a very low charge level. Again, this may be determined by the microcontroller 34 of the electronic device 12, which receives information from the internal battery 38 indicating the charge level of the battery 38. As with the low battery level, the "very low" battery level may be specified by a third party such as a manufacturer or may be user-specified. As one example, a 10% charge may be a very low battery charge level.

If, in operation 330, the embodiment determines that the internal battery is at a very low level, then operation 334 is executed and the embodiment determines if the adapter battery is also at a low level. This may be determined by the microcontroller 32 of the adapter 10, which may receive information from the adapter battery 11 indicating whether the charge level of the battery 11 is very low.

If, in operation 334, the embodiment determines that the adapter battery is at a low level, then operation 336 is accessed and the embodiment will force the adapter and the electronic device to go into sleep mode, or to shut down. This may be accomplished in the embodiment shown in FIG. 2 by transmitting a control signal from the adapter microcontroller unit 32 to the adapter charger 30 to disable charging of the adapter battery. Similarly, the device microcontroller unit 34 of the electric device 12 may also transmit a signal to the charger 36 to disable charging of the internal battery 38. Further, the microcontroller unit may transmit a control signal to the other components of the electronic device 12 to initiate shut down or power off procedures for the electronic device 12. After operation 336, the method terminates in end state 346.

On the other hand, if the embodiment determines in operation 334 that the adapter battery is not at a low level, then in operation 338, the embodiment will charge the internal battery from the adapter battery. As previously described with respect to operation 328, this may be accomplished via the device microcontroller unit 34 of the electronic device 12, which may transmit a control signal to the internal charger 36 to supply voltage to the internal battery 38. Following operation 338, end state 346 is entered.

Returning to operation 330, the embodiment may determine that the internal battery is not at a very low level. In this case, the embodiment executes operation 340 and determines if the adapter battery is at a low level. As previously described, this may be accomplished by the adapter microcontroller unit 32 of the adapter 10, which is configured to receive information indicating a charge level of the adapter battery 11.

If, in operation 340, the embodiment determines that the adapter battery is at a low level, then in operation 336, the embodiment will force the adapter and the electronic device to go into sleep mode, or to shut down. By contrast, if the embodiment determines that the adapter battery is not at a low level in operation 340, then the embodiment will run the electronic device from the adapter battery in operation 328. The implementation of these operations, for example, in the embodiment illustrated in FIG. 2, may be the similar to that previously discussed with respect to steps 334, 336 and 338.

Generally, the foregoing methods of operation have been described and indication has been provided as to what components execute certain operations. It should be appreciated that either microcontroller unit 34, 36 may accomplish or execute functionality described herein that is ascribed to the other unit with appropriate configuration. Likewise, various other operations ascribed to particular hardware elements may be carried out by different elements. Accordingly, the foregoing discussion of particular operations being carried out by particular hardware is provided for illustration only.

Figure 4:
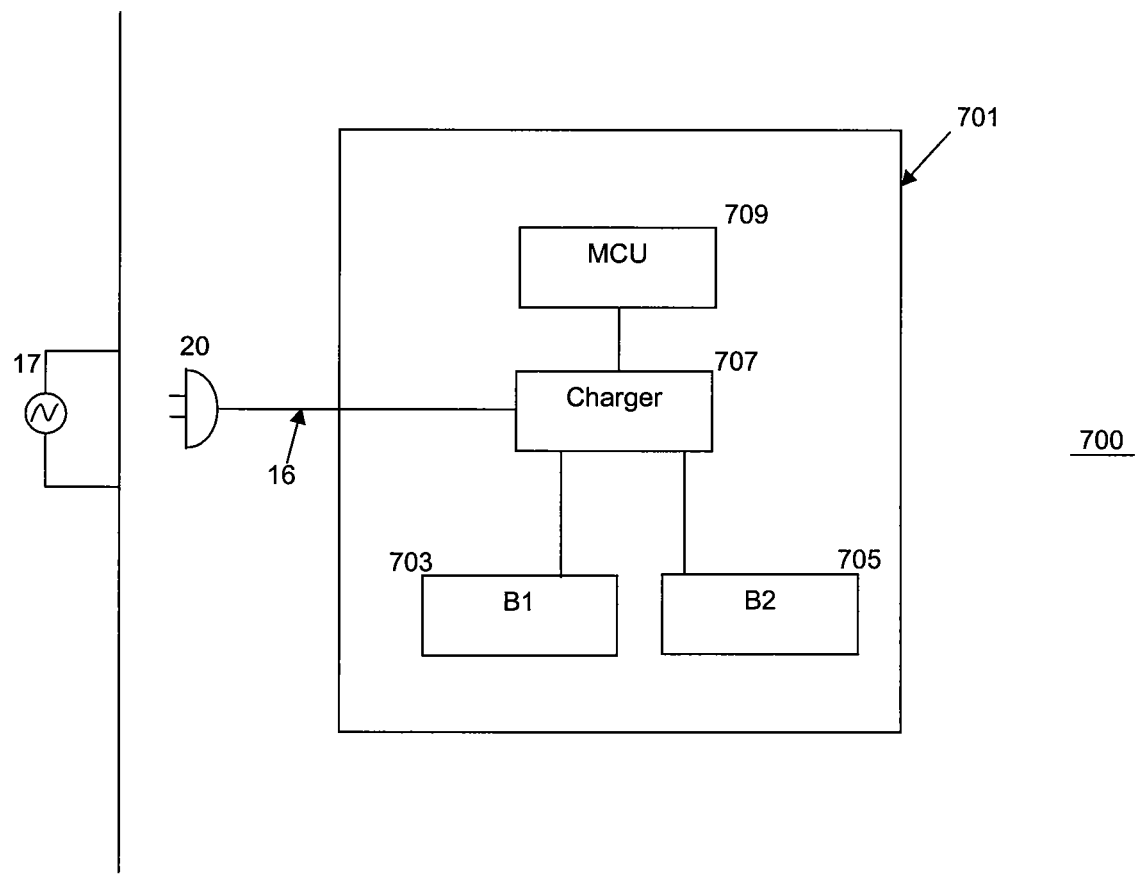
FIG. 4 is a block diagram of another embodiment of an electronic device having multiple rechargeable batteries.

FIG. 4 illustrates another embodiment of an electronic device 700 having two batteries 703, 705 that are located inside the housing 701 of the device 700. Each battery 703, 705, may be connected to a charger 707 configured to charge the batteries 703, 705. In other embodiments, there may be more than one charger 707 provided in the electronic device 700 for example, the device 700 may include one charger 707 provided for each battery 703, 705 of the device 700. A microcontroller unit 709 may be connected to the charger 707 and configured to enable the charger 707 to charge the batteries 703, 705 by supplying voltage received through an input power line 16 that may include a cord and a corresponding plug 20 connected to a power supply 17. Although an electronic device 700 is illustrated in FIG. 7, one of ordinary skill in the art will appreciate that the present invention also encompasses an adapter having multiple battery packs.

Although the present invention has been described with respect to particular embodiments and methods of operation, it should be understood that changes to the described embodiments and/or methods may be made yet still embraced by alternative embodiments of the invention. For example, certain embodiments may omit or add operations to the methods and processes disclosed herein. Accordingly, the proper scope of the present invention is defined by the claims herein.

We claim:

1. A method for powering an electronic device from an adapter having an internal adapter battery, the method comprising:
    determining if the adapter is connected to a power source;
    in the event the adapter is connected to the power source, determine if the device is connected to the adapter, the device comprising an electronic device battery;
    in the event the device is connected to the adapter, operating the device from the power source; and
    in the event the device is not connected to the adapter, charging the internal adapter battery and
    in the event the adapter is not connected to the power source, and if the device is connected to the adapter, determining if a charge of the electronic device battery exceeds a first threshold;
    in the event the charge of the electronic device battery exceeds the first threshold, determining if a charge of the internal adapter battery exceeds a second threshold; and
    in the event the charge of the internal adapter battery exceeds the second threshold, powering the electronic device from the internal adapter battery.

2. The method of claim 1, further comprising:
    in the event the charge of the internal adapter battery does not exceed the second threshold, power the electronic device from the electronic device battery.

3. The method of claim 2, further comprising:
    in the event the charge of the electronic device battery does not exceed the first threshold, determining if the charge of the electronic device battery exceeds a third threshold;
    in the event the charge of the electronic device battery exceeds the third threshold, determining if the charge of the internal adapter battery exceeds the second threshold; and
    in the event the charge of the internal adapter battery exceeds the second threshold, charging the electronic device battery from the internal adapter battery.

4. The method of claim 3, further comprising:
    in the event the charge of the internal adapter battery does not exceed the second threshold, suspending an operation of the electronic device.

5. The method of claim 3, further comprising:
    in the event the charge of the electronic device battery does not exceed the first threshold, determining if the charge of the internal adapter battery exceeds a fourth threshold;
    in the event the charge of the internal adapter battery exceeds the fourth threshold, operating the electronic device from the internal adapter battery; and
    in the event the charge of the internal adapter battery does not exceeds the fourth threshold, suspending an operation of the electronic device.

6. The method of claim 5, wherein the second threshold and fourth threshold are the same.

* * * * *